(No Model.)

W. HALKYARD.
PANORAMIC SIGN FOR CARS.

No. 263,698. Patented Sept. 5, 1882.

WITNESSES:
N. M. Malkin
Henry J. Miller

INVENTOR:
William Halkyard
by Joseph A. Miller & Co
Attorneys

UNITED STATES PATENT OFFICE.

WILLIAM HALKYARD, OF PROVIDENCE, RHODE ISLAND.

PANORAMIC SIGN FOR CARS.

SPECIFICATION forming part of Letters Patent No. 263,698, dated September 5, 1882.

Application filed December 22, 1881. (No model.)

*To all whom it may concern:*

Be it known that I, WILLIAM HALKYARD, of the city and county of Providence, State of Rhode Island, have invented a new and useful Improvement in Advertising Devices for Cars; and I hereby declare that the following is a full, clear, and exact description of the same, reference being had to the accompanying drawings, forming part of this specification.

This invention has reference to an improvement in advertising devices for street or railroad cars; and it consists in so placing an endless apron covered with advertisements in a car that the same can be driven in one direction from one of the axles of the car, irrespective of the direction in which said axle revolves, as will be more fully set forth hereinafter.

Figure 1:
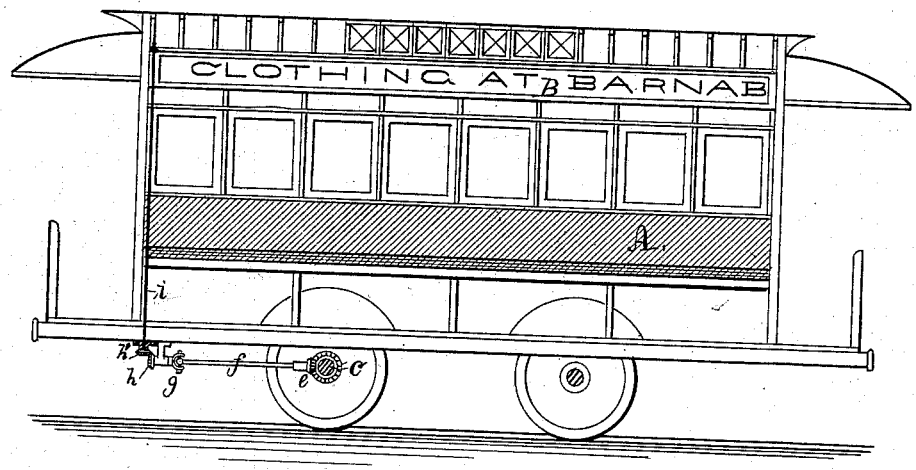
Figure 2:
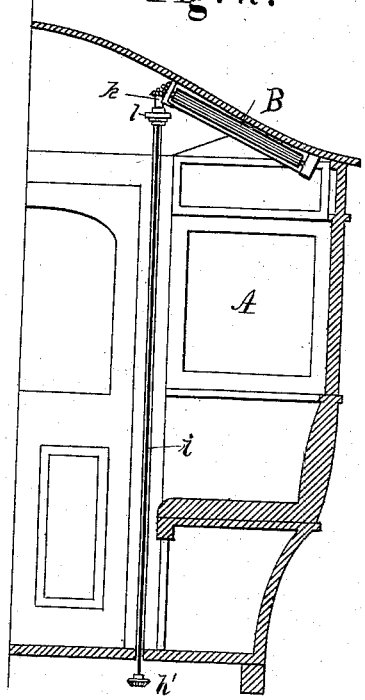
Figure 3:
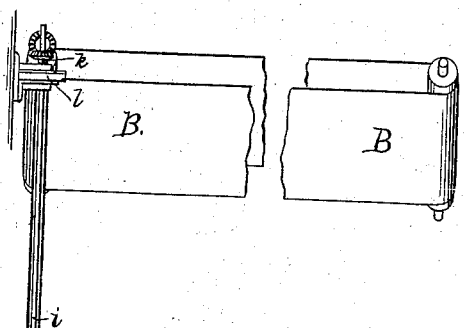
Figure 4:
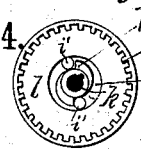
Figure 5:
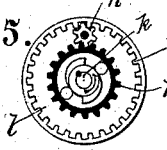
Figure 6:
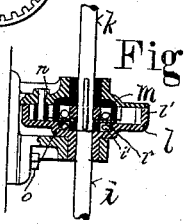

Figure 1 is a longitudinal section of a horse-car provided with an advertising device driven from one of the axles of the car. Fig. 2 is a cross-section of part of a horse-car, showing the connection for driving the endless apron. Fig. 3 is an enlarged skeleton view of the gears and shafts by which motion is transmitted from the axle of the car to the endless apron. Fig. 4 is a view of the disk connected with the driving-shaft, constructed to drive the apron when the car moves in one direction; and Fig. 5 is a view of the disk provided with an idle-gear, connecting the toothed rim with an inner gear for driving the apron in the same direction when the car moves in the opposite direction. Fig. 6 is a sectional view of the driving-clutch provided with the disks shown in Figs. 4 and 5.

The object of this invention is to expose advertisements in cars on an endless apron and drive the same, so as to move always in the same direction.

In the drawings, A represents the body of the car; B, the endless apron on which the advertisements are placed.

C is one of the car-axles.

$d$ is a beveled gear secured to the axle of the car.

$e$ is a pinion gearing into the gear $d$ and driving the sleeve $f$, in which a driving-rod is secured by means of a slot and feather, so as to allow of longitudinal adjustment. The other end of the driving-rod is connected with the beveled pinion $h$ by a universal joint. The beveled pinion $h'$ is connected with the vertical shaft $i$, and is driven by the pinion $h$.

To the upper part of the vertical shaft $i$ an automatic reversible clutch is secured, constructed to drive the short shaft $k$ always in one direction. Such a clutch is shown in Figs. 4, 5, and 6. It consists of the disk $l$, secured to the end of the shaft, and provided with a toothed rim, $l'$, and a recess, $l^2$, in which is seated a cam, $k'$, secured to the upper short shaft, $k$. The cam shown has two cam-surfaces adapted, upon the rotation of the disk $l$ in one direction, to wedge the balls $i'$ against the walls of the recess $l^2$, thus binding the shaft $k$ to the disk $l$ and causing them to move together; but on revolving the disk $l$ in the opposite direction no wedging action will be exerted by the straight surfaces of the cam on the balls, so that said balls can rotate freely within the recess $l^2$, thus severing the driving-connection between the disk and shaft $k$.

Within the rimmed disk $l$ the geared sleeve $m$ is placed, surrounding the shaft $k$, but loose on the same, and the pinion $n$, meshing with the toothed rim $l'$ and geared sleeve, is fixed in a bracket. A cam-clutch similar in all respects to that above described is placed within the sleeve $m$, which connects the short shaft $k$ with the sleeve when the shaft $i$ turns in a direction to break the driving-connection between the disk $l$ and shaft $k$, so that no matter in which direction the car moves the apron is impelled continuously in the direction which will bring the words or letters into view successively in the order in which they are to be read, so that continuous advertising-sentences or other information can be read, even though said sentences occupy a longer space on the apron than is at once exposed to view. The respective cams and their balls are separated from each other by a plate, $o$.

It will be seen that by the arrangement heretofore described of the disk $l$, shaft $k$, and cams thereon, and the sleeve $m$ and pinion $n$ an automatic reversible clutch is formed, by means of which the shaft $k$ is rotated only in one direction, no matter in which direction the car-axle revolves.

It will be understood that I do not confine myself to the specific form of reversible clutch described in the foregoing specification, as other equivalent means may be used to attain the same end—to wit, to so connect the advertising-apron with the car-axle that said apron will always be moved in one direction by the revolution of the axle, irrespective of the direction in which said axle revolves.

Having thus described my invention, what I claim as new, and desire to secure by Letters Patent, is—

In combination with a horse or other car, the endless apron B, the axle C, and means for conveying motion from the axle to the apron, an automatic reversible clutch constructed to drive the apron in one direction only, as described.

WILLIAM HALKYARD.

Witnesses:
J. A. MILLER, Jr.,
HENRY J. MILLER.